United States Patent [19]

Cooperman et al.

[11] Patent Number: 4,818,988
[45] Date of Patent: Apr. 4, 1989

[54] CROSSPOINT SWITCHING ARRAY

[75] Inventors: Michael Cooperman, Framingham; Richard W. Sieber, Attleboro, both of Mass.

[73] Assignee: GTE Laboratories Incorporated, Waltham, Mass.

[21] Appl. No.: 140,511

[22] Filed: Jan. 4, 1988

[51] Int. Cl.[4] .............................................. H04Q 9/00
[52] U.S. Cl. ........................... 340/825.85; 340/825.91; 307/241
[58] Field of Search ...................... 340/825.02, 825.79, 340/825.85–825.91, 825.93; 379/292, 306; 307/241, 465, 468, 469; 370/58

[56] References Cited

U.S. PATENT DOCUMENTS

| | | | |
|---|---|---|---|
| 3,715,444 | 2/1973 | Pearlman | 74/1.01 |
| 3,818,203 | 6/1974 | Perlowski et al. | 340/825.87 |
| 4,011,543 | 3/1977 | Soref et al. | 340/825.89 |
| 4,051,358 | 9/1977 | Schwartz | 340/825.93 |
| 4,453,096 | 6/1984 | LeCan et al. | 307/468 |
| 4,758,745 | 7/1988 | Elgamal et al. | 307/468 |

Primary Examiner—John W. Caldwell, Sr.
Assistant Examiner—Edwin C. Holloway, III
Attorney, Agent, or Firm—David M. Keay

[57] ABSTRACT

A crosspoint switching array of a matrix of crosspoint switches connected in rows and columns. Each crosspoint switch includes an MOS inverter circuit for propagating a digital signal from crosspoint-to-crosspoint along its row. Each crosspoint switch includes a first MOS switch connected to the preceding crosspoint switch in the column and a second MOS switch connected to its row. The second switch is activated to connect the row to the column at a particular crosspoint. Otherwise, the first switch is activated to connect the crosspoint switch to the preceding crosspoint switch in the column. The output of the first or second switch is applied to an MOS inverter circuit for driving the following crosspoint switch in the column.

5 Claims, 3 Drawing Sheets

CROSSPOINT SWITCHING ARRAY

BACKGROUND OF THE INVENTION

This invention relates to crosspoint switching arrays. More particularly, it is concerned with crosspoint switching arrays employing a matrix of crosspoint switches for connecting any one of a plurality of inputs to any one of a plurality of outputs.

A conventional switching array for connecting any one of a plurality of M inputs to any one of a plurality of N outputs employing a matrix of crosspoint switches S is illustrated by FIG. 1. The array is shown arranged in a matrix of M rows by N columns with a switch S at each crosspoint for connecting one of the M rows with one of the N columns. Any M input port can be connected to any N output port by closing the appropriate one of the switches S.

In such an array the switching speed between an input port and an output port is slowed by the stray capacitances of the rows, columns, and switches. It is apparent that the switching speed is decreased as the size of the array or number of switching nodes is increased, increasing the length of the row and column connecting lines.

SUMMARY OF THE INVENTION

A crosspoint switching array for connecting any one of a plurality of M input ports to any one of a plurality of N output ports in accordance wth the present invention includes M×N crosspoint switching means arranged in M rows by N columns. Each crosspoint switching means comprises a row input connection and a row output connection. The row input connection is connected to the row output connection of the preceding crosspoint switching means in the row, and the row output connection is connected to the row input connection of the following crosspoint switching means in the row. Each crosspoint switching means includes a column input connection and a column output connection. The column input connection is connected to the column output connection of the preceding crosspoint switching means in the column, and the column output connection is connected to the column input connection of the following crosspoint switching means in the column. A row buffer means has an input connected to the row input connection and an output connected to the row output connection. A selector means has a first input connected to the column input connection and a second input connected to the row output connection. The selector means has an output connected to the column output connection and also has a control input means. The selector means is operable in response to a first control condition at the control input means to provide a closed circuit condition between the first input and the output thereof and an open circuit condition between the second input and the output thereof. The selector means is operable in response to a second control condition at the control input means to provide an open circuit condition between the first input and the output thereof and a closed circuit condition between the second input and the output thereof.

For a better understanding of the present invention, together with other and further objects, advantages, and capabilities thereof, reference is made to the following disclosure and appended claims in connection with the above-described drawings.

DETAILED DESCRIPTION

Figure 1:
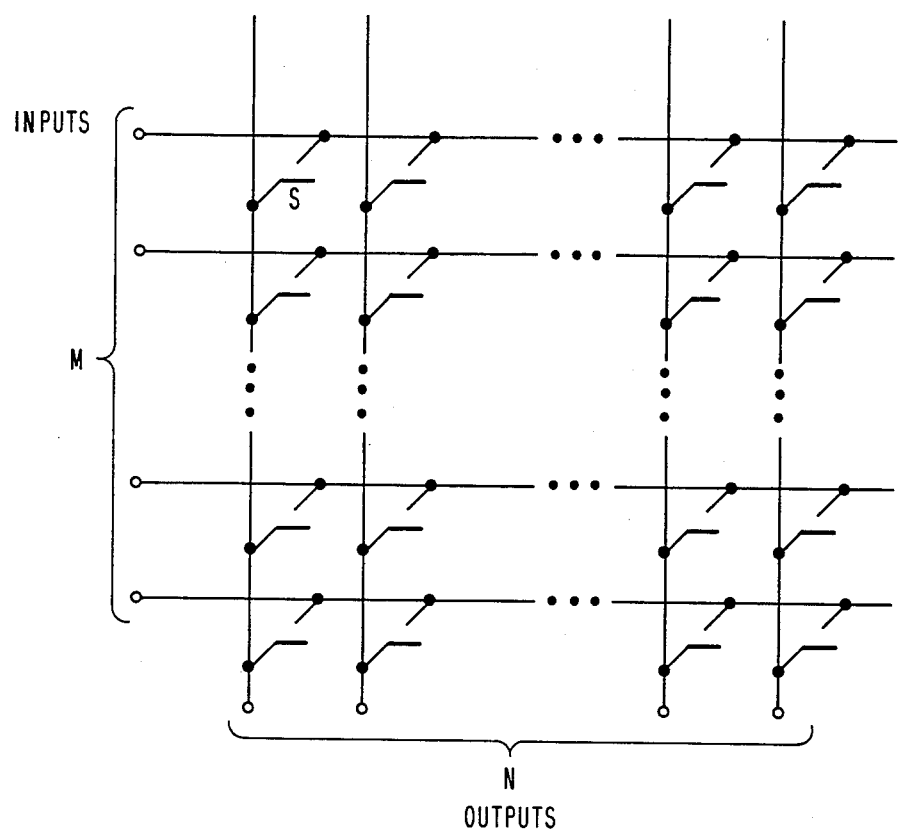
FIG. 1 is a schematic representation of a prior art switching array and is discussed hereinabove.
Figure 2:
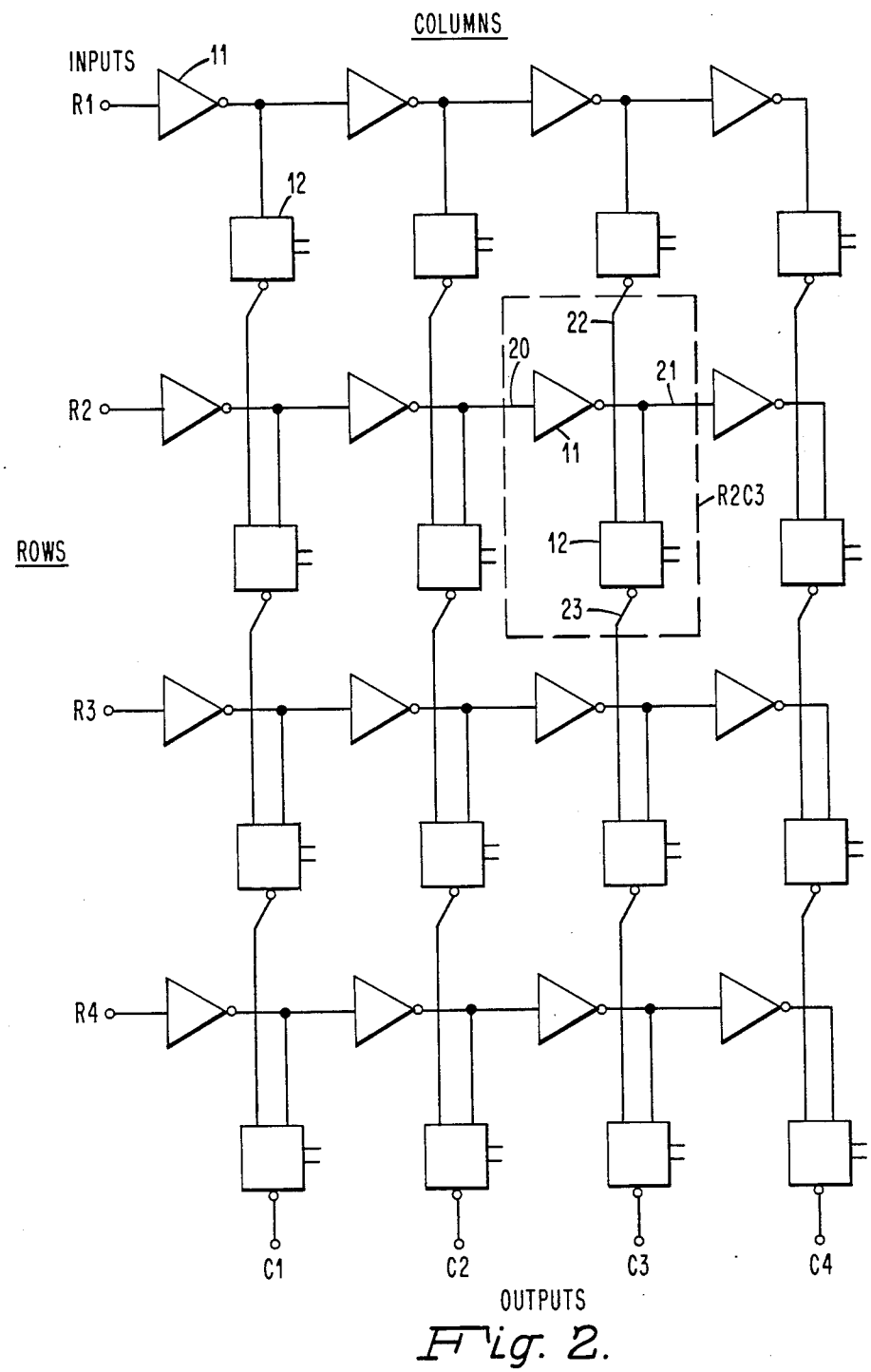
FIG. 2 is a diagram illustrating a crosspoint switching array in accordance with the present invention.

FIG. 2 illustrates an exemplary switching array for digital signals employing a four-by-four matrix of sixteen crosspoint switches for connecting any one of four input ports, labeled R1-R4, to any one of or to any combination of four output ports, labeled C1-C4. Each row includes a buffer 11 at each crosspoint, the buffers being connected along the row in series. Each column includes a selector 12 associated with a buffer 11 at each crosspoint. The selectors 12 of each column are arranged in series, and each selector 12 also has an input connected to its associated row at the crosspoint. The individual buffers 11 are driver circuits and provide isolation between adjacent crosspoints along each row. Each selector 12 also includes a driver circuit which provides isolation between selectors of adjacent crosspoints along each column.

The switching array as illustrated operates generally in the following manner to transmit digital signals present at any one of the input ports R1-R4 to any one of the output ports C1-C4. The digital signals are propagated along the row from crosspoint to crosspoint by the buffers 11. At the crosspoint of the column of the selected output port, the selector 12 is activated to connect the associated row to the associated column. All of the following selectors 12 in the column provide a series connection to the selected output port C1, C2, C3, or C4. The digital signals are propagated along the column from crosspoint-to-crosspoint by the driver circuits in the selectors 12.

Figure 3:
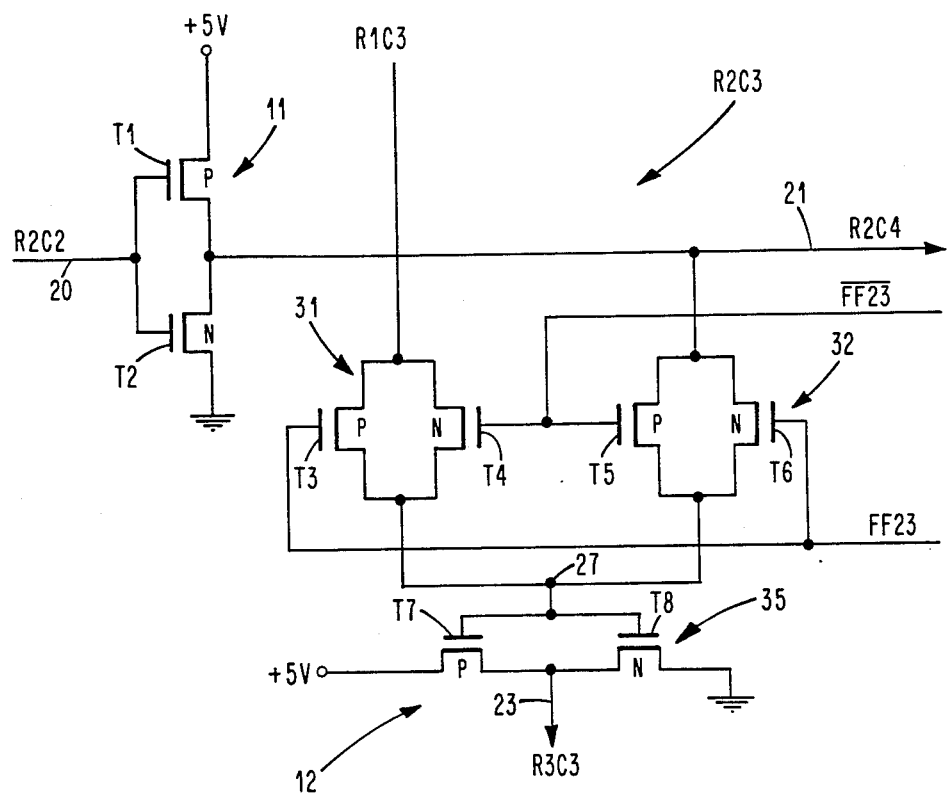
FIG. 3 is a detailed circuit diagram of an individual crosspoint switch in accordance with the present invention.

FIG. 3 illustrates a crosspoint switch, the switch at the crosspoint of row 2 and column 3, labeled R2C3, as an example. The crosspoint switch R2C3 has a row input connection 20 to the row output of the preceding crosspoint switch R2C2 in the row, and an output connection 21 to the input connection of the following crosspoint switch R2C4 in the row. For the first crosspoint switch in a row, the row input connection is connected directly to the input port.

A column input connection 22 is connected to the output of the preceding crosspoint switch R1C3 in the column. A column output connection 23 is connected to the input connection of the following crosspoint switch R3C3 in the column. The column output connection 23 of the last crosspoint switch in a column is connected to the output port.

The buffer 11 is connected in series in the row line between the row input connection 20 and the row output connection 21. The buffer is a driver circuit with two complementary transistors T1 and T2 connected as an inverter. The inverter includes a P-type MOS field effect transistor T1 connected between a voltage source of +5 volts and the output connection N-type MOS field effect transistor connected between the output connection 21 and ground. The gates of the transistors T1 and T2 are connected together and to the row input connection 20. Thus, the buffer 11 in a driver circuit which in response to a binary signal at the input connection 20 produces an inverted output at the output connection 21.

One configuration of a selector 12, as shown in FIG. 3, includes a first switch 31 of a complementary pair of a P-type and an N-type MOS field effect transistor T3 and T4, respectively, connected in parallel between the column input connection 22 and a common juncture 27. A second switch 32 of a complementary pair of a P-type and an N-type MOS field effect transistor T5 and T6, respectively, are connected in parallel between the row output connection 21 and the common juncture 27. The gate of the P-type transistor T3 of the first switch 31 and the gate of the N-type transistor T6 of the second switch 32 are connected together and to a first control input connection labeled FF23. The gate of the N-type transistor T4 of the first switch 31 and the gate of the P-type transistor T5 of the second switch 32 are connected in common to a second control input connection labeled FF23.

A selector output buffer or driver circuit 35 is connected between the juncture 27 and the column output connection 23. The output driver circuit 35 is an inverter and includes a P-type MOS field effect transistor T7 connected between a voltage source of +5 volts and the column output connection 23 and an N-type MOS field effect transistor T8 connected between the column output connection 23 and ground. The gates of the two transistors T7 and T8 are connected in common to the juncture 27 at the outputs of the two switches 31 and 32.

The switching array and crosspoint switch as shown in FIGS. 2 and 3 operate in the following manner. Digital signals applied to any one of the input ports R1-R4 are propagated along the row with each buffer 11 driving the following buffer in the row. At the selected crosspoint, for example R2C3, the digital signals are switched from the row to the column. This switching action is effected by a relatively high control voltage at the first control input connection FF23 and a relatively low control voltage at the second control input connection FF23. These voltages applied to the respective gates cause the transistors T3 and T4 of the first switch 31 to be biased to the nonconducting or off condition, thus presenting an open switch between the column input connection 22 and the juncture 27. These control voltages bias the transistors T5 and T6 of the second switch 32 to the on or conducting condition thus providing a closed switch between the row output connection 21 and the juncture 22. Thus the digital signals being propagated along the row pass through the second switch 32 to the output driver 35 which produces inverted signals on the column output connection 23.

Alternatively, when the crosspoint switch R2C3 is one of the fifteen not selected, the control voltage at the first control input connection FF23 is low and the control voltage at the second control input connection FF23 is high. Under these conditions, transistors T5 and T6 of the second switch 32 are biased to provide an open condition between the row output connection 21 and the juncture 27, and transistors T3 and T4 of the first switch 31 are biased to provide a closed condition between the column input connection 22 and the juncture 27. Thus digital signals received at the column input connection 22 from the preceding crosspoint switch in the column are inverted and enhanced by the driver circuit 35 and coupled to the following crosspoint switch in the column. All of the crosspoint switches except the one selected are in this state so that all the crosspoint switches following the selected crosspoint switch in the same column provide a series connection to the output port of the column. The signals are buffered and inverted at each stage by the driver circuits 35.

In the specific embodiment as disclosed, signal inversion occurs at each crosspoint switch of the array both along the rows and along the columns. This inversion can be compensated for in the circuitry connected to the output ports by including a bit of known polarity in a predetermined position in each digital signal message. Thus it is clear at the output port whether or not a net inversion has occurred. The use of inverters as driver circuits minimizes the number of transistors required. In addition, inverters have equal rise and fall times at the output since the rising waveform at one stage becomes a falling waveform at the following stage. This operating characteristic prevents pulse narrowing or widening thereby maximizing the throughput.

Figure 4:
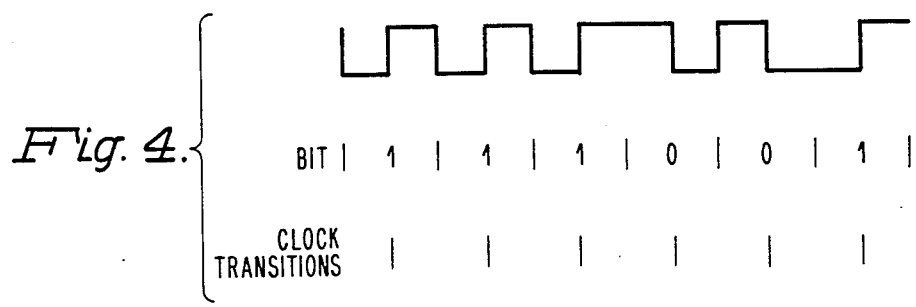
FIG. 4 is a timing diagram illustrating one scheme of encoding binary digital information for transmission through the switching array in accordance with the present invention.

The actions of the buffers or driver circuits at each crosspoint maintain short transitions. However, the total delay is a function of the size of the array and the switching path taken; and, therefore, is different for each received signal. In order to overcome this problem the clock information may be encoded in the transmitted signal. FIG. 4 illustrates one well known scheme for embedding the clock information in the data of the digital signal. A zero-one transition represents a logical one and a one-zero transition represents a logical zero. Thus, a transition occurs midway of each bit position to be used as a clock transition.

The cascade of buffers along the rows and the cascade of buffers along the columns contribute to a proportional accumulation in overall delay while maintaining short transitions between adjacent crosspoints. These short transitions are provided by the gain in the buffers. Each buffer drives only a single crosspoint switch thereby approaching the maximum available switching speed.

While there has been shown and described what is considered a preferred embodiment of the present invention, it will be obvious to those skilled in the art that various changes and modifications may be made therein without departing from the invention as defined by the appended claims.

What is claimed is:

1. A crosspoint switching array for connecting any one of a plurality of M input ports to any one of a plurality of N output ports including M x N crosspoint switching means arranged in M rows by N columns, each crosspoint switching means comprising a row input connection and a row output connection, the row input connection being connected to the row output connection of the preceding crosspoint switching means in the row, and the row output connection being connected to the row input connection of the following crosspoint switching means in the row;

a column input connection and a column output connection, the column input connection being connected to the column output connection of the preceding crosspoint switching means in the column, and the column output connection being connected to the column input connection of the following crosspoint switching means in the column;

row buffer means having an input connected to the row input connection and an output connected to the row output connection;

selector means having a first input connected to the column input connection, a second input connected to the row output connection, an output connected to the column output connection, and control input means;

said selector means being operable in response to a first control condition at the control input means to provide a closed circuit condition between the first input and the output thereof and an open circuit condition between the second input and the output thereof; and said selector means being operable in response to a second control condition at the control input means to provide an open circuit condition between the first input and the output thereof and a closed circuit condition between the second input and the output thereof.

2. A crosspoint switching array in accordance with claim 1 wherein said selector means includes first switching means having an input connected to the fist input of the selector means and having an output;

second switching means having an input connected to the second input of the selector means and having an output;

column buffer means having an input connected to the outputs of the first and second switching means and having an output connected to the column output connection;

said first switching means being coupled to said control input means; said first switching means being biased in a closed condition when the first control condition is present at said control input means, and being biased in an open condition when the second control condition is present at said control input means; and said second switching means being coupled to said control input means; said second switching means being biased in an open condition when the first control condition is present at said control input means, and being biased in a closed condition when the second control condition is present at said control input means.

3. A crosspoint switching array in accordance with claim 2 wherein said row buffer means includes driver circuit means for producing a first predetermined voltage level at the output thereof in response to a digital signal of one binary value at the input thereto and for producing a second predetermined voltage level at the output thereof in response to a digital signal of the opposite binary value at the input thereto; and said column buffer means includes driver circuit means for producing said first predetermined voltage level at the output thereof in response to a digital signal of said one binary value at the input thereto and for producing said second predetermined voltage level at the output thereof in response to a digital signal of said opposite binary value at the input thereto.

4. A crosspoint switching array in accordance with claim 3 wherein said driver circuit means of said row buffer means includes a row inverter circuit of a first row buffer transistor connected between a source of operating potential and said row output connection and a second row buffer transistor, complementary to said first row buffer transistor, connected between said row output connection and a point of reference potential, said first and second row buffer transistors each having a control electrode connected to said row input connection; and said driver circuit means of said column buffer means includes a column inverter circuit of a first column buffer transistor connected between a source of operating potential and said column output connection and a second column buffer transistor, complementary to said first column buffer transistor, connected between said column output connection and a point of reference potential, said first and second column buffer transistors each having a control electrode connected to the outputs of said first and second switching means.

5. A crosspoint switching array in accordance with claim 4 wherein said first switching means includes a first column switching transistor connected between said column input connection and the control electrodes of the first and second column buffer transistors and a second column switching transistor, complementary to said first column switching transistor, connected between said column input connection and the control electrodes of the first and second column transistors in parallel with said first column switching transistor;

said second switching means includes a first row switching transistor connected between said row output connection and the control electrodes of the first and second column buffer transistors and a second row switching transistor, complementary to said first row switching transistor, connected between said row output connection and the control electrodes of the first and second column buffer transistors in parallel with said first row switching transistor;

said first column switching transistor and said second row switching transistor being complementary transistors and each having a control electrode connected in common to a first control input connection;

said second column switching transistor and said first row switching transistor having complementary transistors and each having a control electrode connected in common to a second control input connection;

said first and second column switching transistors being biased for conduction therethrough and said first and second row switching transistors being biased to nonconduction when a first voltage level is present at said first control input connection and a second voltage level is present at said second control input connection; and said first and second row switching transistors being biased for conduction therethrough and said first and second column switching transistors being biased to nonconduction when said second voltage level is present at said first control input connection and said first voltage level is present at said second control input connection;

whereby when said first voltage level is present at said first control input connection and said second voltage level is present at said second control input connection, digital signals present at said row input connection are coupled to said row output connection and digital signals present at said column input connection are coupled to said column output connection; and whereby when said second voltage level is present at said first control input connection and said first voltage level is present at said second control input connection, digital signals present at said row input connection are coupled to said column output connection.

* * * * *